US012501851B2

(12) United States Patent
Lalwani

(10) Patent No.: US 12,501,851 B2
(45) Date of Patent: Dec. 23, 2025

(54) MOWER SLOPE SENSING SYSTEM

(71) Applicant: DEERE & COMPANY, Moline, IL (US)

(72) Inventor: Vinay Lalwani, Navi Mumbai (IN)

(73) Assignee: Deere & Company, Moline, IL (US)

( * ) Notice: Subject to any disclaimer, the term of this patent is extended or adjusted under 35 U.S.C. 154(b) by 614 days.

(21) Appl. No.: 18/047,699

(22) Filed: Oct. 19, 2022

(65) Prior Publication Data
US 2024/0130274 A1 Apr. 25, 2024
US 2024/0224846 A9 Jul. 11, 2024

(51) Int. Cl.
| | |
|---|---|
| *A01D 34/00* | (2006.01) |
| *A01D 34/43* | (2006.01) |
| *A01D 34/86* | (2006.01) |
| *G05D 1/00* | (2006.01) |
| *G05D 1/248* | (2024.01) |
| *G05D 13/62* | (2006.01) |
| *A01D 101/00* | (2006.01) |

(52) U.S. Cl.
CPC ........... *A01D 34/006* (2013.01); *A01D 34/43* (2013.01); *A01D 34/86* (2013.01); *G05D 1/0278* (2013.01); *G05D 1/248* (2024.01); *G05D 13/62* (2013.01); *A01D 2101/00* (2013.01)

(58) Field of Classification Search
CPC ...... A01D 34/006; A01D 34/43; A01D 34/86; G05D 1/248; G05D 13/62
See application file for complete search history.

(56) References Cited

U.S. PATENT DOCUMENTS

| | | | | |
|---|---|---|---|---|
| 5,042,236 | A | * | 8/1991 | Lamusga ............... A01D 75/30 D15/15 |
| 5,204,814 | A | | 4/1993 | Noonan et al. |
| 5,406,778 | A | * | 4/1995 | Lamb .................... A01D 34/44 56/11.9 |
| 5,528,888 | A | * | 6/1996 | Miyamoto .......... A01D 34/008 701/50 |
| 6,109,009 | A | | 8/2000 | Benson |
| 6,675,569 | B2 | | 1/2004 | Mannon et al. |
| 6,892,517 | B2 | | 5/2005 | Adams et al. |
| 7,954,308 | B2 | | 6/2011 | Harris |
| 8,775,066 | B2 | | 7/2014 | O'Connor |
| 9,378,663 | B2 | | 6/2016 | Jensen |
| 9,420,741 | B2 | | 8/2016 | Balutis et al. |
| 9,469,300 | B1 | | 10/2016 | Crawford |

(Continued)

FOREIGN PATENT DOCUMENTS

| | | |
|---|---|---|
| CN | 107111318 A | 8/2017 |
| CN | 107509443 A | 12/2017 |

(Continued)

OTHER PUBLICATIONS

English Language Translation of JP-H08304069 (Year: 1996).*

*Primary Examiner* — Claude J Brown

(57) ABSTRACT

A mower slope sensing system on a grass mowing machine. An elevation sensor may capture terrain elevation values for each of a plurality of different locations according to a latitude and a longitude of each of the locations on a field. An electronic controller may store the terrain elevation values, latitudes and longitudes, and adjust a mowing blade speed depending on changes in the terrain elevation values from a current location to a next expected location.

10 Claims, 4 Drawing Sheets

(56) References Cited

U.S. PATENT DOCUMENTS

| | | |
|---|---|---|
| 2014/0032087 A1 | 1/2014 | Shiri et al. |
| 2016/0073579 A1 | 3/2016 | Henson |
| 2018/0352736 A1 | 12/2018 | Kulkarni et al. |
| 2022/0007570 A1* | 1/2022 | Foster .................... A01D 34/78 |
| 2022/0369545 A1* | 11/2022 | Kaufman ............... G05D 1/027 |

FOREIGN PATENT DOCUMENTS

| | | | |
|---|---|---|---|
| JP | H08304069 A | * | 11/1996 |
| JP | 2012105557 A | | 6/2012 |

* cited by examiner

MOWER SLOPE SENSING SYSTEM

FIELD OF THE INVENTION

This invention relates generally to grass mowing machines, and specifically to a mower slope sensing system that fairway mowers or rough mowers may use on golf courses and playing fields.

BACKGROUND OF THE INVENTION

Grass mowing machines such as fairway mowers or rough mowers may include internal combustion engines to power hydrostatic transmissions for traction drive, and also for a PTO to power hydraulic or electric mowing circuits to rotate blades on five or more reel or rotary cutting units. Alternatively, the traction drive and mowing circuits may be powered by batteries or other electric power sources.

In the past, these grass mowing machines have included electronic controllers that act to prevent engine stalling if PTO load conditions increase when cutting units encounter increased grass density. When PTO load conditions increase, the controllers may be programmed to reduce engine load by reducing hydrostatic transmission output command to reduce vehicle speed.

If the grass mowing machine encounters a slope, however, traction load may suddenly increase or decrease, but the blade rotational speed and PTO load may not change. Additionally, the grass mowing machine may jerk forward or back as the hydrostatic transmission attempts to maintain vehicle speed on hilly terrain. This may result in uneven grass cutting and length of cut.

A mower slope sensing system is needed that can adjust blade rotational speed and provide a smooth transition when the grass mowing machine such as a fairway mower encounters a slope. A mower slope sensing system is needed that provides more even grass cutting on hilly terrain.

SUMMARY OF THE INVENTION

A mower slope sensing system on a grass mowing machine having an electronic controller storing elevation data for a plurality of different locations on a golf course or playing field. The system also includes a global positioning sensor that senses a current location and a direction of travel of the grass mowing machine. The electronic controller may determine an expected next location of the grass mowing machine based on the current location and the direction of travel, and adjust blade speed if the controller determines there will be a slope that exceeds a threshold from the current location to the expected next location.

DESCRIPTION OF THE PREFERRED EMBODIMENT

Figure 1:
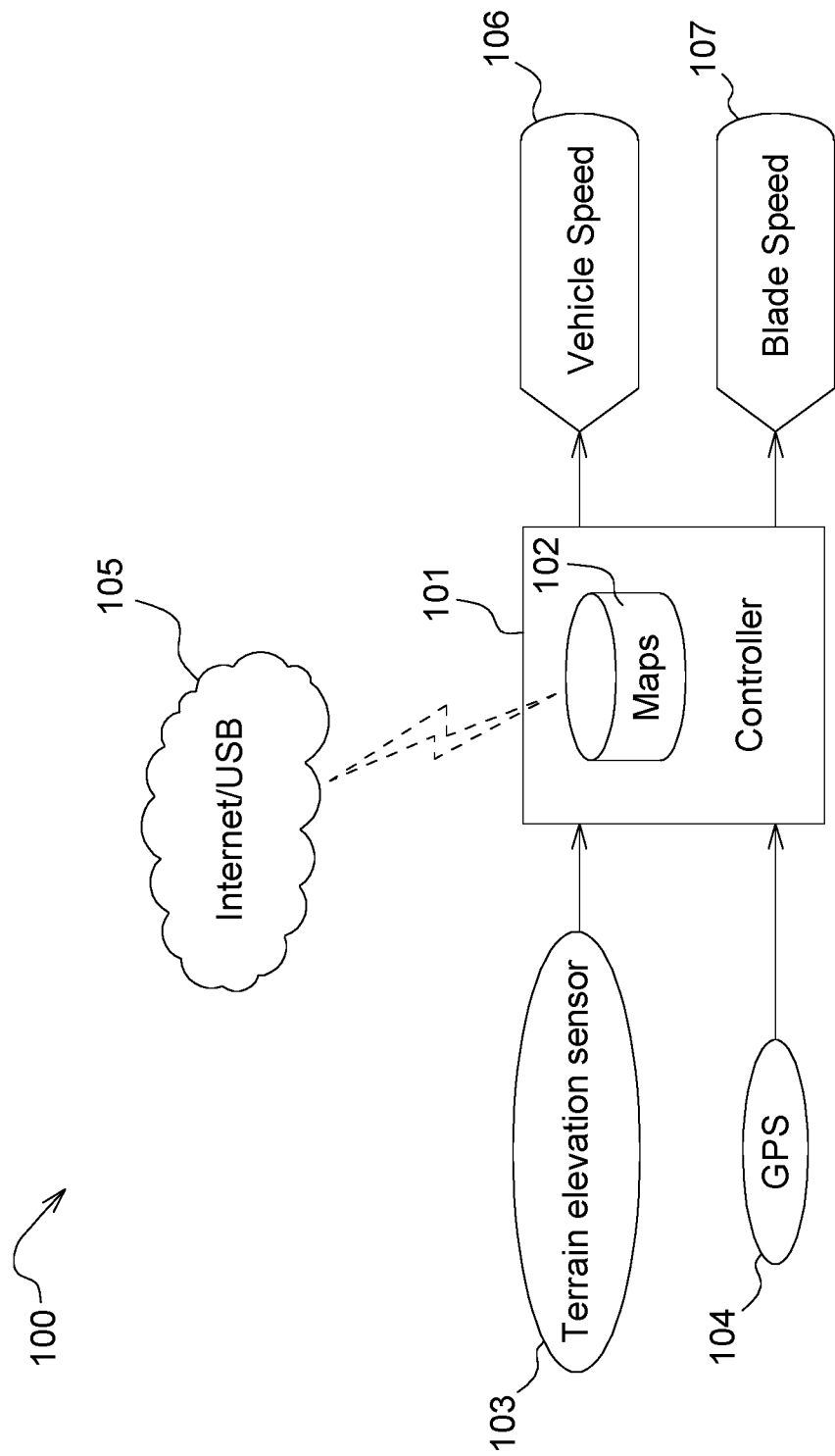
FIG. 1 is a schematic diagram of a mower slope sensing system according to one embodiment of the invention.

In an embodiment shown in FIG. 1, mower slope sensing system 100 may be on a grass mowing machine such as fairway mower having three or more blade or reel cutting units, or on any other grass mowing machine having a multiple cutting units. The grass mowing machine may be powered by an internal combustion engine, batteries, or other energy source. The grass mowing machine may have a hydrostatic or electric traction drive circuit, and a hydraulic or electric mow circuit for the cutting units. The mower slope sensing system may include electronic controller 101 on the grass mowing machine. The controller may include data storage for one mor more elevation maps 102 of golf courses or playing fields. Each map may include the elevation of a plurality of different locations on the golf course or playing field. The elevations on each map may be relative to sea level or to a reference point on the map. Each location may be specified by its latitude and longitude. Optionally, the mower slope sensing system also may be connected to internet/USB 105 to access additional elevation map data.

In the embodiment of FIG. 1, mower slope sensing system 100 also may include terrain elevation sensor 103. The elevation sensor may be installed on the grass mowing machine, or another vehicle for preparing the maps used by the electronic controller. The terrain elevation sensor may detect and provide elevation data to the controller. The terrain elevation sensor may be a high precision altimeter having a resolution or accuracy within about plus or minus 0.1 meters.

In the embodiment of FIG. 1, mower slope sensing system 100 also may include global positioning system (GPS) receiver 104 on the grass mowing machine. The GPS receiver may receive signals for the latitude and longitude of the grass mowing machine and provide the location to the controller.

In the embodiment of FIG. 1, mower slope sensing system 100 also may include vehicle speed sensor 106. The vehicle speed sensor may detect the actual ground speed and provide the ground speed data to the controller. Additionally, the controller may receive data from a throttle or pedal position sensor that may be used to determine acceleration or deceleration of the vehicle. The controller also may command the traction drive system to increase or decrease vehicle ground speed based on elevation data.

In the embodiment of FIG. 1, mower slope sensing system 100 also may include blade speed sensor 107. The blade speed sensor may detect the rotational speed of one or more rotary mower blades or cutting reels and provide the speed or speeds to the controller. The controller may command an increase or decrease of the blade speed based on elevation data.

Figure 2:
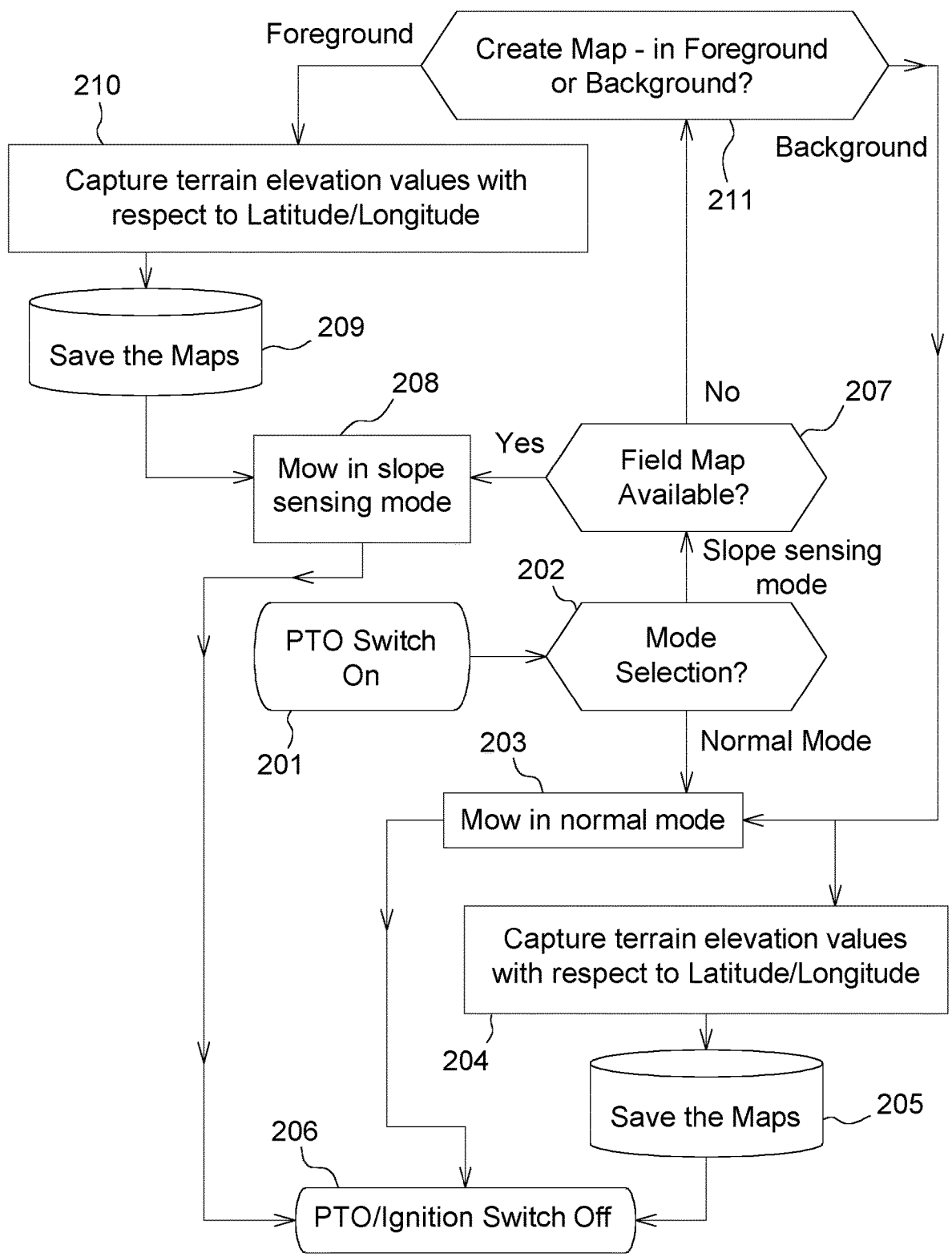
FIG. 2 is a logic diagram of the steps for an electronic controller to obtain and store elevation data for a golf course or playing field using the mower slope sensing system according to a first embodiment of the invention.

FIG. 2 is a logic diagram showing the steps for a controller to obtain and store elevation data for a golf course or playing field using the mower slope sensing system according to a first embodiment of the invention. In step 201, the operator may turn on the power take off (PTO) switch to start rotation of the cutting units. In step 202, the operator may actuate a mode selection switch to select the slope sensing mode or the normal mode. If the normal mode is selected, the vehicle will proceed mowing in normal mode without slope sensing in step 203. If the slope sensing mode is selected, the controller may determine if a field map with terrain elevation data is available in storage in step 207. If a field map is available, the controller may command mowing in slope sensing mode in step 208. If a field map is not available, in step 211 the operator may actuate a control to create a map in the foreground or background. Foreground refers to terrain elevation data that will be obtained and used while continuing to mow the same golf course or playing field in the slope sensing mode, and background refers to data that will be obtained but not used until a later time. If foreground is selected, in step 210 the controller may command the elevation sensor to capture terrain elevation values at multiple locations relative to a reference point on the field, while the GPS sensor detects latitude and longitude for each location, as the mower travels around the golf course or field. In step 209, the controller may save the map which includes the elevation, longitude and latitude data collected for the golf course or field. The controller then may return to step 208 and mow using the slope sensing mode. If background is selected, the controller may command the elevation sensor to capture terrain elevation values at multiple locations while the GPS sensor detects latitude and longitude for each location, as the mower travels around the golf course or field, as shown in step 204. In step 205, the controller may save the map which includes the elevation, latitude and longitude data collected for the golf course or field. In step 206, the PTO/ignition switch may be turned off.

Figure 3:
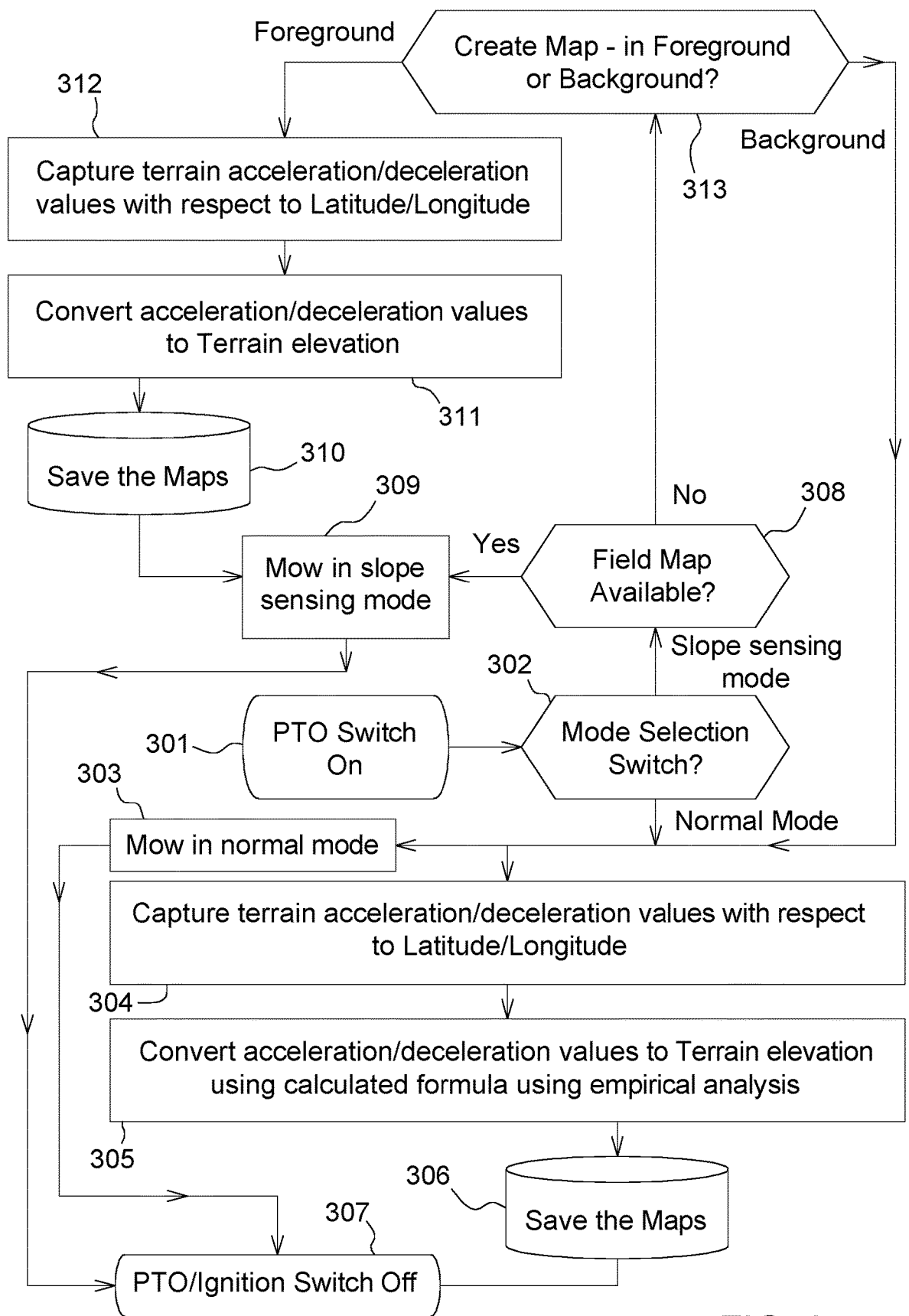
FIG. 3 is a logic diagram of the steps for an electronic controller to obtain and store elevation data for a golf course or playing filed using the mower slope sensing system according to a second embodiment of the invention.

FIG. 3 is a logic diagram showing the steps for a controller to obtain and store elevation data for a golf course or playing field using the mower slope sensing system according to a second embodiment of the invention. In step 301, the operator may turn on the power take off (PTO) switch to start rotation of the cutting units. In step 302, the operator may actuate a mode selection switch to select the slope sensing mode or the normal mode. If the normal mode is selected, the vehicle will proceed mowing in normal mode without slope sensing in step 303. If the slope sensing mode is selected, the controller may determine if a field map with terrain elevation data is available in storage in step 308. If a field map is available, the controller may command mowing in slope sensing mode in step 309. If a filed map is not available, in step 313 the operator may actuate a control to create a map in the foreground or background. Foreground refers to terrain elevation data that will be obtained and used while continuing to mow the same golf course or playing field in the slope sensing mode, and background refers to data that will be obtained but not used until a later time. If foreground is selected, in step 312 the controller may start capturing acceleration/deceleration values from the vehicle speed sensor and throttle or pedal position sensor at multiple locations while the GPS sensor detects latitude and longitude for each location, as the mower travels around the golf course or field. In step 311, the controller may convert the acceleration/deceleration values to terrain elevation. In step 310, the controller may save the map which includes the elevation, longitude and latitude data collected for the golf course or field. The controller then may return to step 309 and mow using the slope sensing mode. If background is selected, in step 304 the controller may start capturing acceleration/deceleration values from the vehicle speed sensor and throttle or pedal position sensor at multiple locations while the GPS sensor detects latitude and longitude for each location, as the mower travels around the golf course or field. In step 305, the controller may convert the acceleration/deceleration values to terrain elevation. In step 306, the controller may save the map which includes the elevation, latitude and longitude data collected for the golf course or field. In step 307, the PTO/ignition switch may be turned off when mowing is completed.

Figure 4:
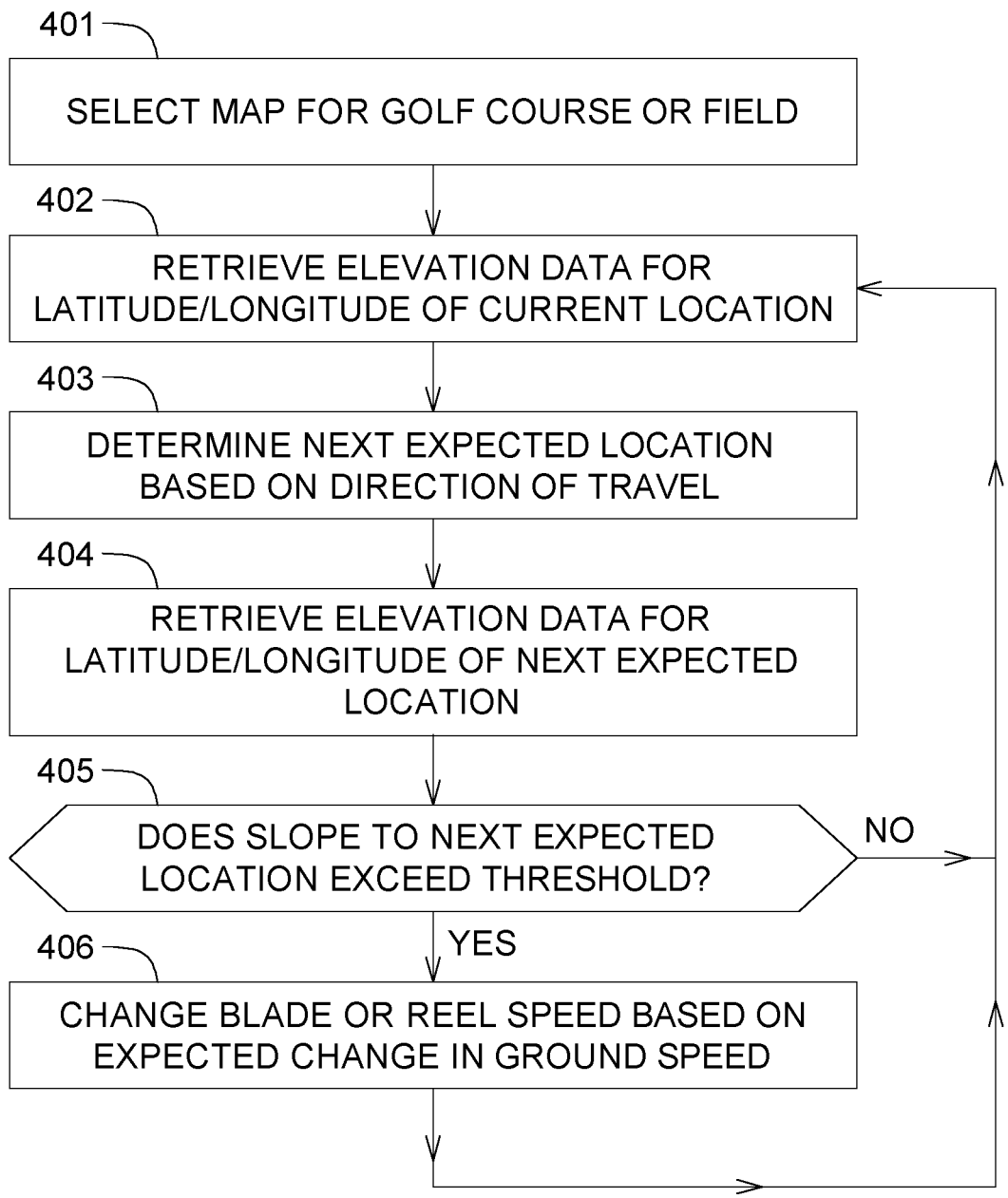
FIG. 4 is a logic diagram of the steps an electronic controller may use to adjust blade speed and ground speed based on elevation data using the mower slope sensing system according to one embodiment of the invention.

FIG. 4 is a logic diagram showing the steps an electronic controller may use to adjust blade speed based on elevation data using the mower slope sensing system according to one embodiment of the invention. In step 401, the electronic controller or the operator may select the map for the golf course or field to be mowed. In step 402, the controller may retrieve stored elevation data for the latitude and longitude of the current location of the mower as detected by the global positioning sensor (GPS). In step 403, the controller may determine the next expected location of the mower based on the direction of travel, also provided by the GPS sensor. In step 404, the controller may retrieve stored elevation data for the next expected location of the mower. In step 405, the controller may determine if the slope to the next expected location exceeds a threshold slope which may be a preset value. If the slope exceeds the threshold, the controller may change the blade or reel speed based on the expected change in ground speed, shown in step 406. If the slope does not exceed the threshold, the logic may return to step 402 where the controller retrieves elevation data for the current location.

The mower slope sensing system may be used to command the mowing system to adjust blade or reel speed in advance of reaching an upslope or downslope. The system also may command the traction drive system to provide a ground speed appropriate for the changed blade or reel speed. For example, the ground speed may be adjusted to provide a specified frequency of cut. As a result, the mower slope sensing system may eliminate any response delay when encountering significant slopes. Instead, the system may provide a smooth change of reel or blade speed, and traction drive speed, at the same time. Thus, the mower slope sensing system is predictive rather than reactive for reel or blade speed control. This results in more precise and uniform length of cut for sloped surfaces.

Having described a preferred embodiment, it will become apparent that various modifications can be made without departing from the scope of the invention as defined in the accompanying claims.

The invention claimed is:

1. A mower slope sensing system, comprising:
   a grass mowing machine having an electronic controller storing elevation data for a plurality of different locations on a golf course or playing field, and having a global positioning sensor that senses a current location and a direction of travel of the grass mowing machine;
   the electronic controller determining an expected next location of the grass mowing machine based on the current location and the direction of travel, adjusting blade speed if the controller determines there will be a slope that exceeds a threshold from the current location to the expected next location, and adjusting blade speed based on an expected change in ground speed from the current location to the expected next location.

2. The mower slope sensing system of claim 1 wherein the electronic controller stores the elevation data for a plurality of different locations using the latitude and longitude of each location.

3. A mower slope sensing system, comprising:
   an elevation sensor capturing terrain elevation values for each of a plurality of different locations according to a latitude and a longitude of each of the locations on a field; and an electronic controller storing the terrain elevation values, latitudes and longitudes; and adjusting a mowing blade speed depending on a change in the terrain elevation value from a current location to a next expected location.

4. The mower slope sensing system of claim 3, wherein the grass mowing machine is a fairway mower having a plurality of reel cutting units.

5. The mower slope sensing system of claim 3, wherein each terrain elevation value is relative to a reference point on a field.

6. The mower slope sensing system of claim 3 wherein the electronic controller determines the next expected location based on a direction of travel provided by a global positioning sensor.

7. The mower slope sensing system of claim 3 further comprising a global positioning sensor detecting the latitude and longitude of each location.

8. A mower slope sensing method comprising the steps of:
capturing terrain elevation data for a plurality of locations on a field;
storing the terrain elevation data along with the latitude and longitude of each location;
determining any change in the terrain elevation data from a current location to a next expected location; and
changing a mower blade speed if the extent of change in terrain elevation data exceeds a threshold.

9. The mower slope sensing method of claim 8 wherein the step of determining any change in the terrain elevation data from a current location to a next expected location includes determining the direction of travel.

10. The mower slope sensing method of claim 8 wherein the step of capturing terrain elevation data for a plurality of locations on a field includes collecting acceleration and deceleration values for each of a plurality of different locations, and converting the acceleration and deceleration values to terrain elevation values.

* * * * *